United States Patent Office 3,186,534
Patented June 1, 1965

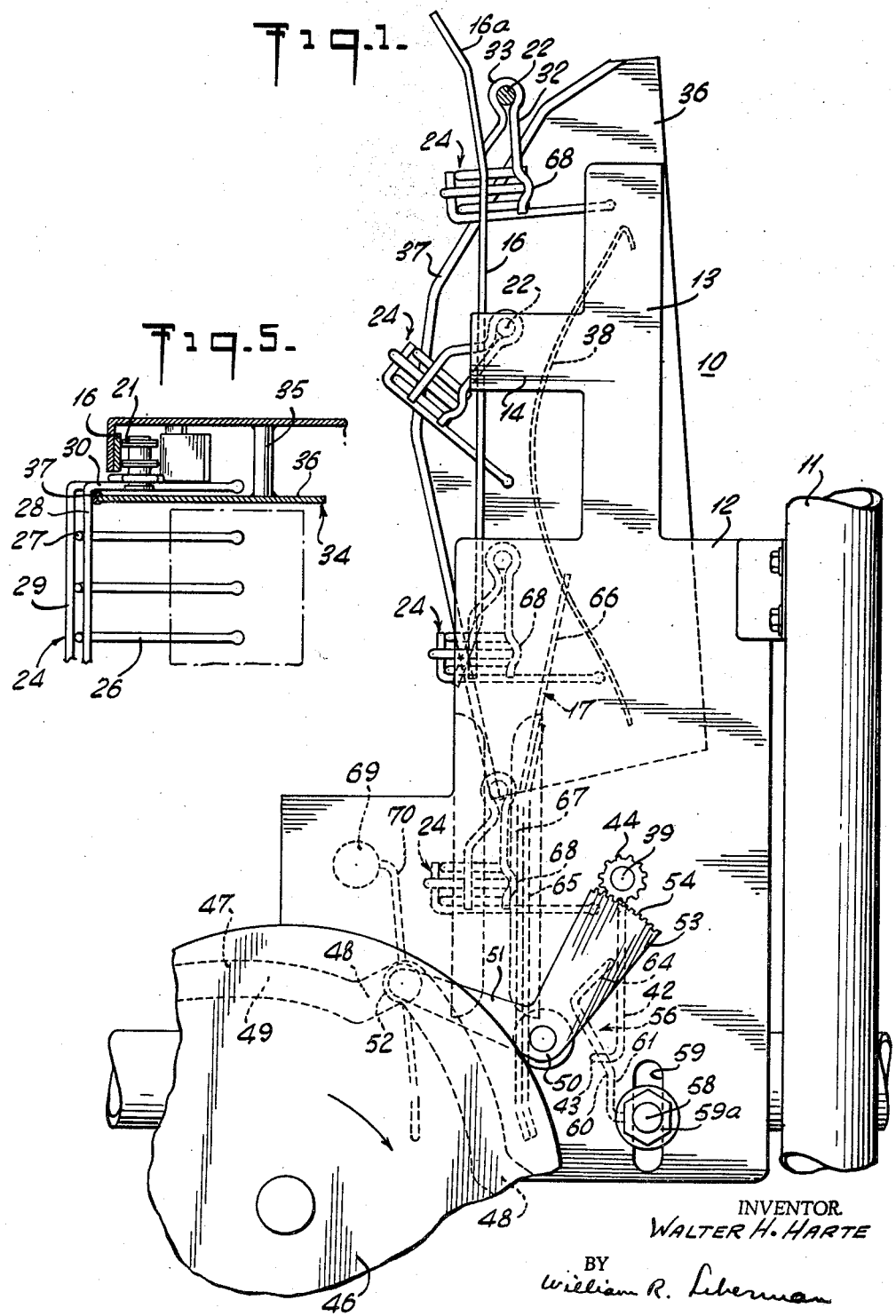

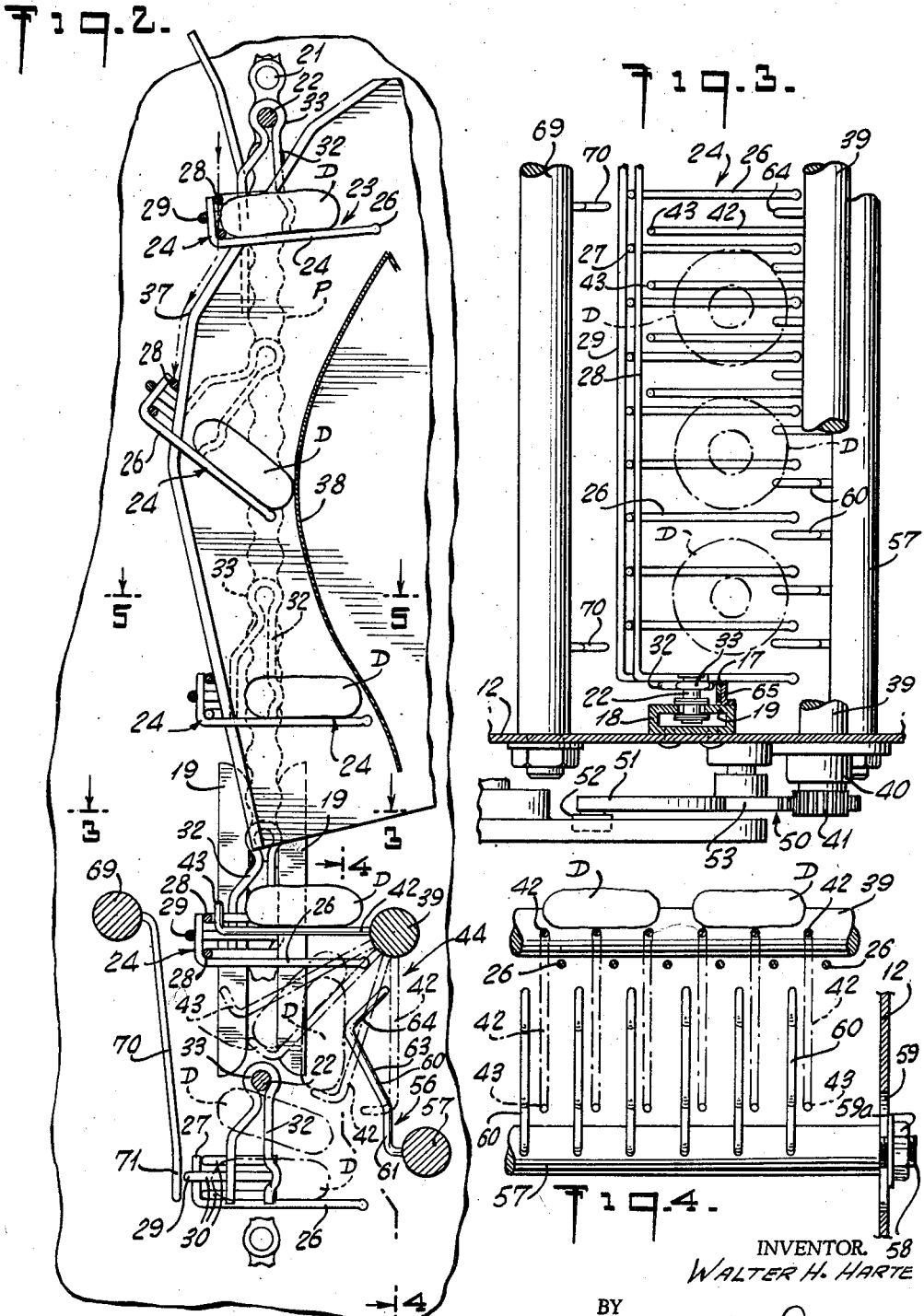

3,186,534
COMESTIBLE TREATING APPARATUS
Walter H. Harte, Cherry Hill, N.J., assignor to DCA Food Industries Inc., New York, N.Y., a corporation of New York
Filed Dec. 4, 1962, Ser. No. 242,321
13 Claims. (Cl. 198—33)

The present invention relates generally to improvements in comestible-producing equipment and it relates particularly to an improved apparatus for the transportation and handling of baked products attendant the processing thereof.

In the production of baked products, as typified by deep fried cakes such as doughnuts which are deep fried in fats that are normally solid at room temperature, in many cases large quantities of fats are absorbed by the fried cake. As a consequence, upon the cooling of the cake, the fat migrates to the bottom of the cake and forms an unsightly, clearly visible ring of solidified fat which detracts not only from the appearance but also from the palatability of the product. It has been found that the fat ring may be obviated and the fat uniformly distributed in the cake by turning or inverting the fried cake during the cooling thereof. This is done in multiple-pass type coolers which are provided with a plurality of vertically spaced endless belts having discharge ends overlying the feed ends of next successive belts so that as the cakes drop from one belt to the next they are inverted. While this procedure for cooling deep fried cakes reduces the local concentration of absorbed fat and the tendency to form visible fat rings it possesses numerous drawbacks and disadvantages. Freshly fried cakes, particularly when they are still warm, are very fragile and tender by nature and are easily broken or shape-distorted unless correctly and delicately handled. Where the cooling of the cakes is effected by means of a multiple pass cooler of the above type, breakage or damage to the cakes due to their tumbling is frequent and results in a serious reduction in production efficiency. A further drawback of the multiple conveyor cooler is its limited flexibility relative to the flow of air so that the cooling cycle is at best a compromise. Moreover, these coolers present many problems in sanitation, maintenance and servicing and otherwise leave much to be desired.

It is therefore a principal object of the present invention to provide an improved apparatus for the treatment of comestibles.

Another object of the present invention is to provide an improved apparatus for the handling of baked products.

Still another object of the present invention is to provide an improved apparatus for the cooling of deep fried cakes.

A further object of the present invention is to provide an improved apparatus for conveying and turning deep fried cakes attendant the cooling thereof in order to promote the uniform distribution of fat therethrough.

Still a further object of the present invention is to provide an apparatus of the above nature characterized by its delicate handling of the cakes with a minimum of breakage, its flexibility, reliability, and ease of sanitary maintenance and servicing.

The above and other objects of the present invention will become apparent from a reading of the following description taken in conjunction with the accompanying drawings wherein:

FIGURE 1 is a fragmentary front elevational view of a cake-transporting and turning apparatus constructed according to and embodying the present invention;

FIGURE 2 is a longitudinal medial vertical sectional view thereof;

FIGURE 3 is a sectional view taken along line 3—3 in FIGURE 2;

FIGURE 4 is a sectional view taken along line 4—4 in FIGURE 2; and

FIGURE 5 is a sectional view taken along line 5—5 in FIGURE 2.

In a sense, the present invention contemplates the provision of a comestible-treating apparatus comprising a plurality of trays adapted to carry comestibles, means for successively transporting said trays past a turning station and means at said station for removing said comestibles from a registering tray and redepositing said comestibles in inverted positions on said respective tray.

According to preferred form of the present apparatus, there is provided a pair of laterally spaced sprocket chains advancing in part downwardly along a vertical path and supporting between them a plurality of regularly spaced tray members. Each tray member includes a base section comprising a plurality of transversely spaced, cantilevered first fingers supported at their trailing ends and upstanding walls along the rear and rear sides of the base sections. A pair of bracket arms project upwardly from the side ends of the base section and pivotally engages the sprocket chains so as to be freely swingable. Vertically extending first and second guide members extend along the upper part of the vertical path of the tray members, the first guide member slidably engaging the descending trays to tilt their leading ends downwardly and the second guide member being disposed along the leading edges of the tilted trays to limit the sliding of comestibles thereon. A transfer turning member is disposed forward of the vertical lower path of the tray members and includes a transverse rocker bar from which project rearwardly a plurality of transversely spaced second cantilevered fingers, offset transversely relative to the first fingers and terminating in upwardly directed heel-defining legs. Means are provided to rock the turning member in synchronism with the advance of a tray an increment equal to the tray spacing, between an advanced substantially horizontal position with the first and second fingers in vertically interdigitating registry in the vicinity of the upper position of a tray at the turning station and a retracted, substantially vertical position forward of the first fingers and above the concurrently advanced respective tray. An ejection member is located in the path of the rocking turning member and includes third fingers interdigitating the second fingers and projecting rearwardly thereof when the turning member is retracted, the third fingers being vertically and horizontally adjustable. Thus, comestibles such as fried cakes are transferred from a tray to the waiting turning member which swings downwardly with the descent of the tray and as is approaches its vertical position the ejection member flips the cakes about the heel of the turning member onto the same lowered tray.

Referring now to the drawings which illustrate a preferred embodiment of the present invention, reference numeral 10 generally designates the improved turning mechanism as applied to the cooling of freshly fried doughnuts, one or more of the mechanisms being successively located in a cooling tunnel through which the cooling air is circulated in any desired manner. A support frame is disposed in the cooling tunnel and includes a pair of transversely spaced tubular posts 11 on which is suitably mounted a pair of transversely spaced vertical bracket plates 12 provided with upwardly directed arms 13 having intermediate rearwardly directed legs 14. Secured to a flange terminating each of the legs 14 is a chain guide strip member 16 provided with an upper upwardly rearwardly inclined section 16a and a lower vertical section extending to the bracket plate 12. Also mounted on the confronting faces of bracket plates 12 is a pair of vertically extending chain guide channels 18 which extend below guide member 16 and include side legs terminating in inwardly directed flanges 19 to delineate a chain guide vertical slot, the upper ends of the flanges 19 sloping outwardly to provide a guide throat.

A pair of endless conveyor sprocket chains 21, supported in any well known fashion, traverse transversely aligned vertical paths P substantially along the plane of the inner faces of bracket plates 12, the chains 21 being synchronously driven in any suitable manner so as to advance downwardly along the vertical paths P. Chains 21 are guided along their vertical paths initially by guide members 16 and thereafter by the channel flanges 19 which register with the grooves delineated by the confronting links of each chain 21. Carried by sprocket chains 21 are regularly linearly spaced pairs of horizontally axially aligned tray support pins 22 directed toward each other.

Swingably suspended from each pair of axial pins 22 is a tray member 23 including a horizontal base section 24 formed of a plurality of transversely spaced cantilevered forwardly longitudinally directed wire first fingers 26 provided at their trailing ends with upwardly directed legs 27. The fingers 26 are secured in assembled condition by upper and lower transverse rods 28 welded to the front faces of the legs 27 and an intermediate transverse rod 29 welded to the rear faces of the legs 27. The rods 28 and 29 terminate in forwardly directed legs 30 ending about midway along the depth of the tray base 24 and define tray side walls, legs 27 and rods 28 and 29 delineating the tray rear wall. Affixed to the outer faces of each set of side wall legs 30 is an upwardly directed wire bracket 32 provided with an upper eye section 33, rotatably engaging a corresponding pin 22. Trays 23 are thus regularly swingably supported by and along the chains 22 and are of such configuration that the bases 24 thereof normally assume substantially horizontal positions.

In order to locate doughnuts D on the tray bases 24 precisely, attendant the turning thereof, there is provided a pair of opposite tray tilting guides 34 each of which includes a plate 36 spaced inwardly of a corresponding bracket plate 12 and mounted thereon by means of standoffs 35. The trailing edge of each of the tilting plates 36 is convex and registers with the spaces in the tray bases 24 immediately adjacent the side wall legs 30. Extending along and affixed to the trailing edge of each plate 36 is a tilting rod 37 which slidably bears against the inside face of the tray rear walls during a part of their descent. The tilting rods 37 start at upper points forward of the tray rear wall when the corresponding tray 24 is horizontal, slope rearwardly and then forwardly as they descend to lower points likewise forward of the rear wall of a horizontal tray. Thus, as a tray member is transported downwardly, the rear wall thereof of engaged by the tilting rods 37 to swing the tray to a forwardly downwardly inclined position and is then released by the tilting rods to return to horizontal position.

A vertically extending, rearwardly convex restraining plate 38 is supported by and between bracket plates 12 and has a rearwardly directed face disposed just forwardly of the path of the free ends of fingers 26 as the tray members 23 traverse the tray-tilting part of their vertical paths. Thus, doughnuts D, carried by tray members 23, slide forwardly as the tray members are tilted and their forward motion is limited by restraining plate 38. Thus, as the trays approach the turning station, the doughnuts are correctly positioned on the tray bases 24.

Following the doughnut positioning mechanism is a doughnut turning mechanism which includes a transversely extending rockable shaft 39 journalled in bearings 40 mounted on the plates 12. Shaft 39 is disposed forwardly of the leading edges of tray member bases 24 and projects beyond the bearing 40 and has a gear 41 affixed to its free end. Mounted on and projecting rearwardly from shaft 39 are a plurality of regularly transversely spaced parallel coplanar cantilevered second fingers 42 terminating at their free ends in heel defining upwardly directed legs 43. The second fingers 42 are transversely offset relative to the first fingers 26 so that the fingers interdigitate when at a common level, permitting the intersecting passage of a tray member 23 and the second finger-defining turning and transfer member 44.

In order to rock turning member 44 in proper timed sequence with the advance of tray members 23, there is provided a circular cam 46 rotated clockwise in synchronism with the advance of the chains 21 in any well known manner. A cam groove 47 is formed in the surface of the cam 46 and includes regularly spaced successive sharp fall sections 48 and gentle rise sections 49. It is to be noted that cam 46 is rotated an increment corresponding to the distance between successive corresponding sections thereof in synchronism with the advance of the chains 21 an increment equal to the distance between successive pairs of tray-carrying pins 22. A bell crank 50 is rockably mounted at its elbow to bracket plate 12 and includes a first arm 51 which carries at its free end a cam follower roller 52 engaging the cam grove 47 and an angularly related second arm 53 which carries along its outer edge an arcuate rack 54 which meshes with gear 41. Cam 46 is advantageously so phased relative to chains 21 that a tray base 24 is about at the level of the turning member 44 when in its advanced horizontal position approximately at the time follower 52 registers with a cam fall section 48.

Cooperating with the turning transfer member 44 is a vertically adjustable ejector member 56 which includes a transversely extending cross bar 57 terminating at opposite ends in threaded shanks 58 of reduced cross-section which register with vertical slots 59 formed in the bracket plates 12 below and immediately forward of the turning member shaft 39. The bar 57 is releasably locked in a selected vertical position by nuts 59a engaging shanks 58 and bearing on the outer faces of bracket plates 12 through intermediate washers. Affixed to and projecting from the rear face of the bar 57 are a plurality of regularly transversely spaced third wire fingers 60 which are transversely offset relative to the turning member second fingers 42 and the tray member first fingers 26 so as to permit the clearance of these fingers as they traverse intersecting paths. Each of the third fingers 60 includes a lower vertical section 61 terminating in a rearwardly directed leg affixed to bar 57, an intermediate upwardly rearwardly inclined section 63 and an upwardly forwardly inclined top section 64. The elbows of finger sections 63 and 64 are disposed rearwardly of turning member fingers 42 when turning member 44 is in its retracted position and also rearwardly of the free ends of tray fingers 26. It is to be noted that the longitudinal positions as well as the vertical positions of the elbows of the ejector fingers 60 are adjustable.

In order to prevent the swinging of tray members 23 during the doughnut turning operation, there are provided opposite guide rods 17 which are suitably supported in the vertical planes of the tray member bracket arms 32 by means of bracket assemblies 65 mounted on the channel guides 18. Each guide rod includes an upper upwardly forwardly inclined section 66 and a lower vertical section 67 which slidably engages the front faces of forwardly bowed lower sections 68 of tray member brackets 37 thereby to limit the swinging of the tray members as they traverse the doughnut turning station. A back up assembly is located on the turning station along the rear of the path of tray members 23, and includes a cross bar 69 which supports depending slightly forwardly inclined rods 70 terminating in short vertical sections 71 immediately rearwardly of the registering tray member rear wall.

Considering now the operation of the apparatus described above, as a tray member 23 is conveyed downwardly by chains 21 it is carried into engagement with the guide rods 37 which bear against the tray member rear wall to tilt the tray base 24 forwardly downwardly.

Tilting of the tray member causes the doughnuts D to slide forwardly along the base 24 until they bear against and are stopped by plate 38 which, upon further descent and leveling of the tray, urges the doughnuts rearwardly until the leading edges are in transverse alignment adjacent the leading edge of the tray base 24. As the tray enters the turning station, the turning member is advanced to its horizontal position by cam 46 through the cam follower, bell crank and rack and pinion gear mechanism above described. Upon further descent of the tray member 23, the base 24 passes below the turning member fingers 42, the fingers 26 and 42 passing each other in an interdigitating relationship and the doughnuts D are transferred from the tray member 23 to the turning member 44. The cam 46 then slowly retracts the turning member 44 so that its free edge remains above the respective tray member base, the doughnuts carried thereby sliding into abutment with the heels 43. As the turning member 44 approaches its fully retracted position, the ejection member fingers 60 pass rearwardly between the turning member fingers 42 bearing against the upper parts of the doughnuts D to swing them about the heels 43 and thus deposit the doughnuts D in an inverted position upon the underlying tray member base 24. The turning member is then rotated to its advanced position to repeat the above doughnut turning cycle on the next successive tray member 23. It should be noted that the base of the leading tray member is below the free ends of the turning member fingers 46 at least the height of a doughnut before the advance of the turning member.

While there has been illustrated and described a preferred embodiment of the present invention, it is apparent that numerous alterations, omissions and additions may be made without departing from the spirit thereof.

What is claimed and desired to be secured by Letters Patent is:

1. A comestible treating apparatus comprising a tray member including a plurality of transversely spaced longitudinally extending cantilevered first fingers, means for advancing said tray member downwardly along a predetermined vertically extending path, a turning member including a platform having an upper face and defined by a plurality of transversely spaced, longitudinally extending second fingers directed oppositely to said first fingers and being transversely offset relative thereto and located in the path of said tray member whereby to interdigitate said first fingers with the advance of said tray member, and means for swinging said turning member upwardly to an advanced comestible-receiving position underlying said tray member and thereafter swinging said turning member downwardly with the advance of said tray member to a retracted position with the upper face of said platform disposed along and facing in the direction of said tray member and supporting said comestible for discharge from said turning member into said tray member.

2. A comestible treating apparatus comprising a tray member for carrying a comestible and including a plurality of transversely spaced longitudinally extending cantilevered first fingers, means for advancing said tray member downwardly along a predetermined vertically extending path, means for longitudinally adjusting the position of said comestible on said tray member during the advance of said tray member, a turning member including a plurality of transversely spaced, longitudinally extending second fingers directed oppositely to said first fingers and being transversely offset relative thereto and located in the path of said tray member whereby to interdigitate said first fingers with the advance of said tray member, and means for rocking said turning member in synchronism with the advance of said tray member between an advanced comestible-receiving position and a retracted position supporting a comestible for discharge from said turning member.

3. The comestible treating apparatus of claim 2, wherein said position-adjusting means comprises a first guide member extending along the path of said tray member and slidably engaging said tray member to tilt said first fingers downwardly toward the free ends thereof to promote the sliding of comestibles supported on said first fingers toward said free ends, and a second guide member disposed along the path of the free ends of said first fingers to limit the sliding of said comestibles.

4. A comestible treating apparatus comprising a tray member including a plurality of transversely spaced longitudinally extending cantilevered first fingers and a pair of upwardly directed support arms located at opposite transverse ends of said tray member, means pivotally engaging the upper portions of said support arms to swingably support said tray member, means for advancing said tray member downwardly along a predetermined vertically extending path, a turning member including a plurality of transversely spaced, longitudinally extending second fingers directed oppositely to said first fingers and being transversely offset relative thereto and located in the path of said tray member whereby to interdigitate said first fingers with the advance of said tray member, and means for rocking said turning member in synchronism with the advance of said tray member between an advanced comestible-receiving position and a retracted position supporting a comestible for discharge from said turning member.

5. A comestible treating apparatus comprising a tray member including a plurality of transversely spaced longitudinally extending cantilevered first fingers, means for advancing said tray member downwardly along a predetermined vertically extending path, a turning member including a plurality of transversely spaced, longitudinally extending second fingers directed oppositely to said first fingers and being transversely offset relative thereto and located in the path of said tray member whereby to interdigitate said first fingers with the advance of said tray member, means for rocking said turning member in synchronism with the advance of said tray member between an advanced comestible-receiving position and a retracted position supporting a comestible for discharge from said turning member, and an injection member comprising a plurality of transversely spaced third fingers interdigitating said turning member fingers above the centers thereof whereby to turn said comestible in the same sense as said retracting turning member and return it to said tray member in an inverted position.

6. The comestible treating apparatus of claim 5, including a back up member disposed along the path of said tray member opposite to said ejection member.

7. A comestible treating apparatus comprising a tray member including a plurality of transversely spaced longitudinally extending cantilevered first fingers, means for advancing said tray member downwardly along a predetermined vertically extending path, a turning member including a plurality of transversely spaced, longitudinally extending second fingers directed oppositely to said first fingers and being transversely offset relative thereto and located in the path of said tray member whereby to interdigitate said first fingers with the advance of said tray member, and means for rocking said turning member in synchronism with the advance of said tray member between an advanced comestible-receiving position and a retracted position supporting a comestible for discharge from said turning member, said second fingers terminating in legs which are directed upwardly when said turning member is in its advanced position.

8. A comestible treating apparatus comprising a pair of opposed sprocket chains advancing downwardly along a substantially vertical path, a plurality of regularly spaced tray members supported by and between said sprocket chains, each tray including a base member formed of transversely spaced cantilevered first fingers supported at their trailing ends and directed longitudinally forwardly toward their free ends and a pair of upwardly directed bracket arms pivoted to corresponding of said sprocket chains to permit the swinging of said tray members, a turning member disposed along the vertical path of said tray members and including a transversely extending rocker bar disposed forwardly of said first fingers and a plurality of cantilevered second fingers transversely offset relative to said first fingers and projecting longitudinally rearwardly from said rocker bar toward their free ends, and means rocking said turning member in synchronism with the advance of said tray members between a receiving advanced position with said second fingers in substantially interdigitating registry with said first fingers of one of said tray members and a retracted position with said second fingers being downwardly directed toward said advanced respective tray member.

9. The comestible treating apparatus of claim 8, including a first guide member extending along the vertical path of said tray members and engaging said tray members to forwardly tip said tray members along their path path trailing said turning member whereby to urge said comestibles forwardly along said trays.

10. The comestible treating apparatus of claim 9, including a second guide member extending along a path adjacent to the free ends of said first fingers trailing said turning member to restrict the forward movement of said comestibles along said trays.

11. The comestible treating apparatus of claim 8, wherein said first fingers terminate in heel elements.

12. The comestible treating apparatus of claim 8, including an ejection member comprising a plurality of transversely spaced, rearwardly directed third fingers interdigitating and projecting rearwardly of said second fingers when said turning member is in retracted position.

13. The comestible treating apparatus of claim 12, including means for vertically adjusting said third fingers.

References Cited by the Examiner
UNITED STATES PATENTS

| | | | |
|---|---|---|---|
| 562,967 | 6/96 | Miles. | |
| 2,006,832 | 7/35 | Hunter | 198—33 X |
| 2,974,774 | 3/61 | Stuart | 198—33 |

SAMUEL F. COLEMAN, *Primary Examiner.*

EDWARD A. SROKA, *Examiner.*